June 17, 1952     D. I. CRITOPH     2,600,975
UNITARY CONDENSER LENS ASSEMBLY MOUNTING MEANS FOR PROJECTORS
Filed Feb. 10, 1951
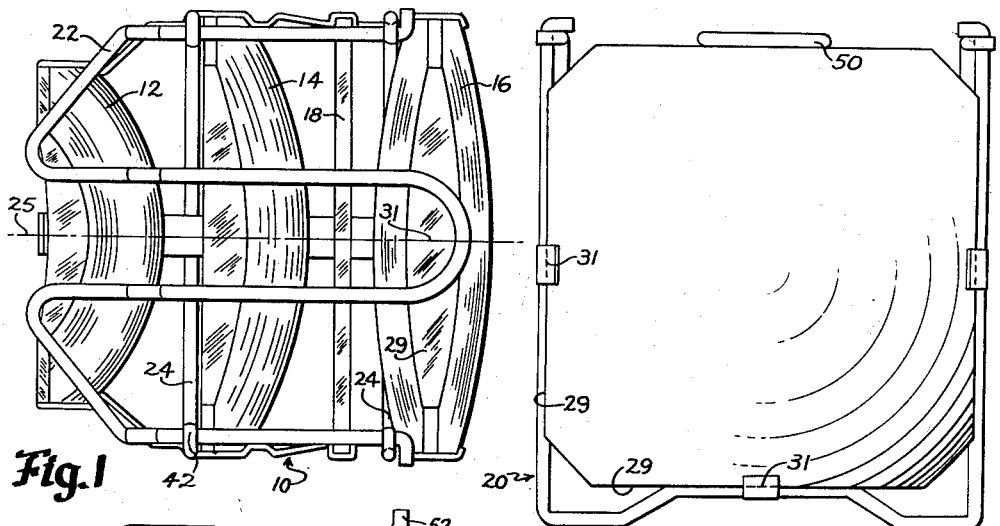
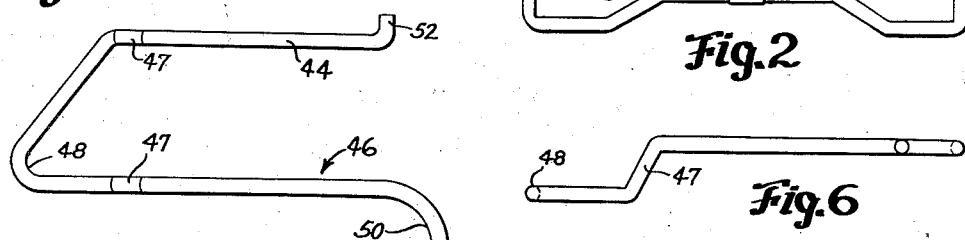
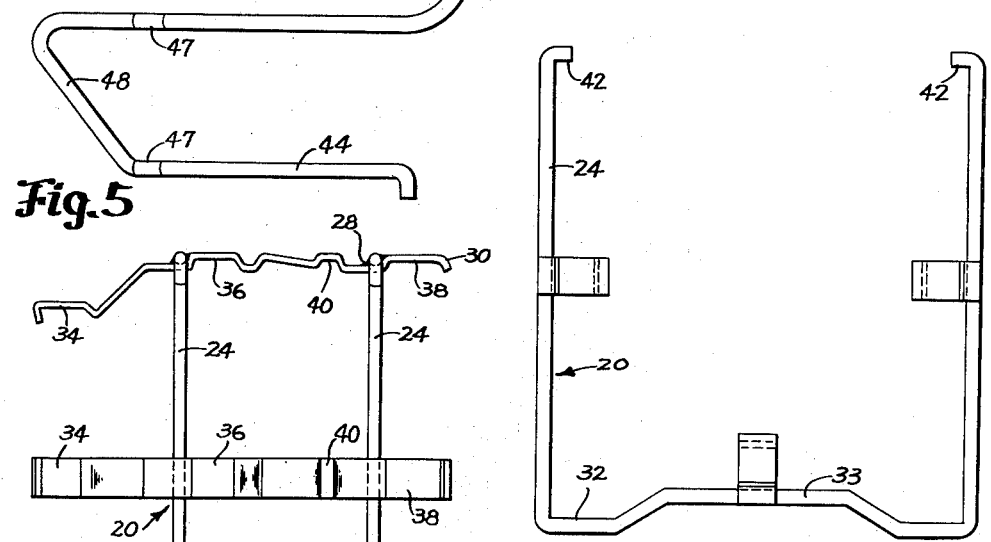
INVENTOR.
DAVID I. CRITOPH
ATTORNEYS Patented June 17, 1952

2,600,975

UNITED STATES PATENT OFFICE 2,600,975

UNITARY CONDENSER LENS ASSEMBLY MOUNTING MEANS FOR PROJECTORS

David I. Critoph, Grand Rapids, Mich., assignor to American Optical Company, Southbridge, Mass., a voluntary association of Massachusetts Application February 10, 1951, Serial No. 210,404

5 Claims. (Cl. 88—57)

This invention relates to picture projectors, spot lights and the like and more particularly to a unitary condenser assembly for use therewith.

In motion picture projectors, still projectors, spot lights and the like of the present construction, it is often desirable to provide a plurality of lens elements, and at times a heat screen, within the projector for directing and concentrating a light beam from the light source thereof into an objective optically aligned therewith. It is desirable in such a projector to allow free flow of cooling air between and around the various components of the condenser assembly for cooling purposes as well as desirable to be able to remove the condenser lens elements and heat screen at times from the instrument for cleaning or replacement purposes.

Accordingly, the present invention provides a unitary condenser assembly which not only enables large quantities of cooling air to pass freely and quietly through and around the components of the condenser assembly but also an assembly which may be readily removed from the projector, when desired, and easily opened to allow the components therein to be easily and individually removed when required. The condenser assembly is of sturdy but economical, light-weight and durable construction and also of such an arrangement that it exactly positions and firmly secures the several optical components of the condenser system in properly aligned and spaced relation within. Furthermore, the condenser assembly is of such construction that it is substantially impossible for any of the various optical components to be removed from the assembly and thereafter replaced therein in any location other than its proper location or facing in any but its right direction.

It is, accordingly, an object of the present invention to provide a light-weight, sturdy, durable and economical open framework condenser assembly for containing a plurality of optical components, and which assembly may be readily inserted in an exact position within a projector housing in proper relation relative to the other optical parts thereof or removal from the projector as a unit and readily opened in a manner to allow said optical components to be individually removed when desired and exactly repositioned therein without difficulty or error.

Other objects and advantages of the invention will become apparent from the detailed description which follows when taken in conjunction with the accompanying drawing in which:

Fig. 1 is a plan view of a removable unitary condenser assembly for use in a picture projector or the like:

Fig. 2 is a front view thereof;

Fig. 3 is a plan view of a framework or rack forming a part of the condenser assembly;

Fig. 4 is a front view thereof;

Fig. 5 is a plan view of a closure member for said framework; and

Fig. 6 is a side view of said closure member.

Referring to the drawings in detail and particularly Fig. 1, it will be seen that a removable unitary condenser assembly, indicated generally by the numeral 10, is arranged to receive and accurately position a plurality of condenser components or elements 12, 14 and 16 in aligned spaced relation as well as a heat absorbing element 18 between the components 14 and 16. It is essential for best performance of a projector that such an arrangement of optical components or elements be not only exactly spaced in a predetermined manner relative to each other but also that they have their individual optical axes accurately aligned relative to each other and relative to the optical parts of the instrument with which they are to be used. In order to enable this to be accomplished in an efficient and inexpensive manner, the condenser assembly 10 comprises an open framework or rack 20 (see Figs. 3 and 4) and a removable closure member 22 (see Figs. 5 and 6) associated therewith. The framework 20 in turn is formed by a plurality of generally U-shaped members 24, of like formation, which are disposed transversely relative to the optical axis 25 of the assembled optical components in Fig. 1. To these U-shaped members are fixedly secured as by brazing, welding or the like, as indicated at 28, a plurality of longitudinally extending identical elongated strips of sheet material 30 of special formation or configuration as will be presently described. For compactness, opposite edge portions of each convergent lens component have been removed to effect four straight edge portions which in the case of each lens, respectively, are of substantially equal lengths and, accordingly, of substantially equal thickness at their mid-points 31.

Each of the generally U-shaped frame members 24 is provided at lower corner portions thereof with foot-forming parts 32 which are produced by causing a central portion 33 of each frame member to be bent inwardly a prearranged controlled amount. To the inwardly bent central portion 33 of each frame member is secured one of the elongated bent strip members 30, and to each upstanding side arm portion of each U-shaped member 24 is likewise secured one of these elongated strip members; so that a bottom edge portion and opposed side edge portions of each optical component 12, 14 and 16 may be engaged thereby substantially at said mid-points when in operative assembled position. Preferably the central portion 33 of each frame member 24 is raised just enough to place all strips 30 equal distances from the optical axis 25 when the components 12, 14 and 16 are in an assembled position. Each longitudinal strip member 30 is preferably preformed in accordance with the predetermined dimensions of the optical components of the condenser lens system which they are to support so that, as will be seen particularly in Fig. 3, sets of inwardly facing recesses 34, 36 and 38 will be provided for receiving components 12, 14 and 16. Also, it will be noted, smaller inwardly facing recesses 40 are provided in each strip 30 for receiving the edges of the heat absorbing element 18. As will be readily apparent from the disclosure, the longitudinal dimension of each recess, as well as the transverse dimension between the recesses of each set are such that when the lens elements are inserted, they will be snugly and accurately held in aligned position thereby. Also note that when these components 12, 14 and 16, as well as the heat absorbing element 18, are to be placed in the framework 20, it will be possible to insert these parts in the framework at only one location, and with reference to non-symmetrical components, facing in only one direction; thereby insuring proper reassembly every time the lenses are removed for optical surface cleaning purposes or the like.

It will be readily apparent from an inspection of the drawing, wherein a preferred embodiment of the invention has been disclosed, that the U-shaped frame members may be readily made from wire, strip, or bar-like material, preferably of circular cross-section and of stainless steel, which may be easily bent into the shapes preferred. Likewise, the elongated wire, strip or bar-like material 30 may be easily initially formed into unit lengths and bent into the longitudinal contour shape desired readily, and here again stainless steel material is preferred. These several parts 24 and 30 thereafter may be readily and securely gripped in a jig or the like or proper type while the U-frames and strips are brazed, welded or otherwise connected together. In this way, the three-sided rack or framework 20 shown by Figs. 3 and 4 may be accurately formed. In forming U-frame members 24, the opposed upstanding free arm portions thereof will be so shaped, with reference to the optical components to be supported thereby, that they will cause firm grip between the opposed elongated bent strips 30 when the optical components are inserted through the open side of the framework 24 and pressed firmly into operative positions in recesses 34, 36 and 38. Even though a very slight flexing may be expected in these free upstanding arm portions of the frame members 24, the flexing in both arms will be of equal magnitude and, accordingly, substantial alignment of the optical components will be assured.

The upper-most free end portions of each U-shaped frame member is bent inwardly at right angles as indicated at 42 sufficiently to form fingers, the purpose for these inwardly projecting finger portions being to form confining means within which elongated resilient arm portions 44 of an elongated bent closure member 46 may be retained. By making the closure member 46 of substantial length, the free arm portions 44 adjacent its opposite ends may be easily flexed inwardly sufficiently to be readily engaged beneath or disengaged from the pairs of inwardly projecting finger portions 42, when desired. The closure member 46 is likewise formed preferably of stainless steel wire. It is bent into a generally W-shape configuration when viewed in plan but is also bent downwardly adjacent one end as indicated at 47 so as to provide downwardly extending bight portions 48 arranged to overlie and engage the smaller optical component 12 and retain same in place. The configuration also provides a central reversed elongated bight portion 50 which is elevated relative to portions 48 and overlies optical components 14 and 16, as well as the heat absorbing element 18, and serves to resiliently secure these parts in engagement with their respective recesses formed in the lower elongated strip member 30. To facilitate locating and engagement between the closure member 46 and the framework 20 during assembly, the extreme end portions 52 of this member 46 are bent outwardly as shown.

Since the frame members 24 are preferably formed of heavy wire of circular cross-section, it will be readily apparent that the foot-forming portions 32 may be arranged to rest in V-shaped grooves or equivalent parts (not shown) of an associated projector in which the condenser assembly is to be employed in such a manner as to be accurately positioned by same with reference to the other conventional optical parts of the instrument.

As will be apparent from an inspection of Figs. 1 and 2, the framework just described provides a maximum of unobstructed air space around each optical component so that cooling air may flow freely therebetween. Also, it will be apparent that the structural parts of the condenser assembly may be economically formed from elongated wire or strip material of standard stock sizes. These parts may be preformed readily by ordinary stamping or other known processes, and may be easily assembled in exact position for welding or the like. Since only a very few connections 28 are required, the operation may be done efficiently and rapidly. However, the finished structure is such that the optical parts will always be rigidly maintained in proper alignment, but may be removed from the instrument easily, and the individual elements or components may be removed from the framework readily for cleaning without difficulty and replaced without chances of error.

Having described my invention, I claim:

1. A condenser assembly for use in a projector or the like, and constructed and arranged to hold a plurality of optical components forming a condenser lens system in optical alignment and in predetermined spaced relation relative to each other, said assembly comprising a plurality of longitudinally spaced transversely disposed generally U-shaped frame members formed of relatively long thin narrow material, a plurality of longitudinally extending elongated pieces of relatively thin narrow material fixedly secured to each of said spaced frame members at spaced points so as to form a three-sided framework, each of said elongated pieces of material being similarly bent at a plurality of locations intermediate its ends so as to form a plurality of inwardly facing recesses, said elongated pieces being secured to said frame members in a manner so as to locate like recesses in said pieces in common transverse planes respectively, the width of each recess and its spacing relative to the other recesses in the same transverse plane being such as to accommodate and firmly operatively engage spaced peripheral portions of each of said optical components, and a removable closure member having spaced portions resiliently and releasably engaging opposite free end portions of each U-shaped frame member, and having intermediate portions thereof resiliently engaging peripheral portions of each of said optical components so as to retain same in said frame work in said predetermined spaced relation.

2. A condenser assembly for use in a projector or the like, and constructed and arranged to hold a plurality of optical components forming a condenser lens system in optical alignment and in predetermined spaced relation relative to each other, said assembly comprising a plurality of longitudinally spaced transversely disposed generally U-shaped frame members formed of relatively long thin narrow material, a plurality of longitudinally extending elongated pieces of relatively thin narrow material integrally secured to each of said spaced frame members at spaced points so as to form a three-sided rigid framework, each of said elongated pieces of material being similarly bent at a plurality of locations intermediate its ends so as to form a plurality of inwardly facing recesses, said elongated pieces being secured to said frame members in a manner so as to locate like recesses in said pieces in common transverse planes respectively, the width of each recess and its spacing relative to the other recesses in the same transverse plane being such as to accommodate and firmly operatively engage spaced peripheral portions of each of said optical components, and a removable closure member formed of relatively thin narrow elongated material having opposite end portions resiliently and releasably engaging opposite free end portions of each U-shaped frame member, and having intermediate portions thereof resiliently engaging peripheral portions of each of said optical components so as to retain same in said framework in said predetermined spaced relation.

3. A condenser assembly for use in a projector or the like, and constructed and arranged to hold a plurality of optical components forming a condenser lens system in optical alignment and in predetermined spaced relation relative to each other, said assembly comprising a plurality of longitudinally spaced transversely disposed frame members formed of strip material, each of said frame members comprising a generally horizontally disposed bottom portion and a pair of upstanding side arm portions, a longitudinally extending elongated strip of sheet material fixedly secured to the bottom portion of each of said spaced frame members and a pair of longitudinally extending strips of sheet material fixedly secured to said upstanding side arm portions so as to form a three-sided framework, each of said elongated strips of sheet material being similarly bent at a plurality of locations intermediate its ends so as to form a plurality of inwardly facing recesses, said elongated strips being secured to said frame members in a manner so as to locate like recesses in said strips in common transverse planes respectively, the width of each recess and its spacing relative to the other recesses in the same transverse plane being such as to accommodate and firmly operatively engage spaced peripheral portions of each of said optical components, and a removable closure member having spaced portions resiliently and releasably engaging opposite free end portions of each frame member, and having intermediate portions thereof resiliently engaging peripheral portions of each of said optical components so as to retain same in said framework in said predetermined spaced relation.

4. A condenser assembly for use in a projector or the like, and constructed and arranged to hold a plurality of optical components forming a condenser lens system in optical alignment and in predetermined spaced relation relative to each other, said assembly comprising a plurality of longitudinally spaced transversely disposed frame members formed of strip material, each of said frame members comprising a transversely extending bottom portion and a pair of vertically extending side arm portions, each bottom portion extending upwardly somewhat intermediate its junction with said side arm portions so as to form a pair of supporting feet adjacent said side arm portions, a longitudinally extending elongated strip of sheet material fixedly secured to the raised intermediate portion each of said spaced frame members and a pair of longitudinally extending strips of sheet material fixedly secured to said upstanding side arm portions at spaced points so as to form a three-sided framework, each of said elongated strips of sheet material being similarly bent at a plurality of locations intermediate its ends so as to form a plurality of inwardly facing recesses, said elongated strips being secured to said frame members in a manner so as to locate like recesses in said strips in common transverse planes respectively, the width of each recess and its spacing relative to the other recesses in the same transverse plane being such as to accommodate and firmly operatively engage spaced peripheral portions of one of said optical components, and a removable closure member having spaced portions resiliently and releasably engaging opposite free end portions of each frame member, and having intermediate portions thereof resiliently engaging peripheral portions of each of said optical components so as to retain same in said framework in said predetermined spaced relation.

5. A condenser assembly for use in a projector or the like, and constructed and arranged to hold a plurality of lens components forming a condenser lens system in optical alignment and in predetermined arrangement and spaced relation relative to each other, and with each of said lens components having diametrically opposed flattened substantially parallel edges formed thereon which differ from the other lens components by at least one of the lens thickness at said flattened edges and the distance between said flattened edges thereon, said assembly comprising a plurality of longitudinally spaced transversely disposed generally U-shaped frame members formed of strip material, a plurality of longitudinally extending elongated strips of sheet material fixedly secured to each of said spaced frame members at spaced points so as to form a three-sided framework, each of said elongated strips of sheet material being similarly bent at a plurality of locations intermediate its ends so as to form a plurality of inwardly facing recesses, said elongated strips being secured to said frame members in a manner so as to locate like recesses in said strips in common transverse planes respectively, the width of each recess and its spacing relative to the other recesses in the same transverse plane being such as to accommodate and firmly operatively engage peripheral portions of each of said optical components, and a removable closure member having spaced portions resiliently and releasably engaging opposite free end portions of each U-shaped frame member, and having intermediate portions thereof resiliently engaging peripheral portions of each of said optical components so as to retain same in said framework in said predetermined spaced relation.

DAVID I. CRITOPH.

REFERENCES CITED

The following references are of record in the file of this patent:

UNITED STATES PATENTS

| Number | Name | Date |
|---|---|---|
| 859,215 | Guilbert | July 9, 1907 |
| 870,535 | Bausch | Nov. 12, 1907 |
| 1,338,818 | Dennington | May 4, 1920 |
| 2,169,010 | Teague et al. | Aug. 8, 1939 |
| 2,231,743 | Young et al. | Feb. 11, 1941 |
| 2,380,613 | Ress | July 31, 1945 |
| 2,477,107 | Wolfe | July 26, 1949 |

FOREIGN PATENTS

| Number | Country | Date |
|---|---|---|
| 228,704 | Great Britain | Feb. 12, 1925 |